No. 758,481. PATENTED APR. 26, 1904.
L. H. SIMON.
SELF SETTING AND EVER SET ANIMAL TRAP.
APPLICATION FILED APR. 18, 1903.
NO MODEL.
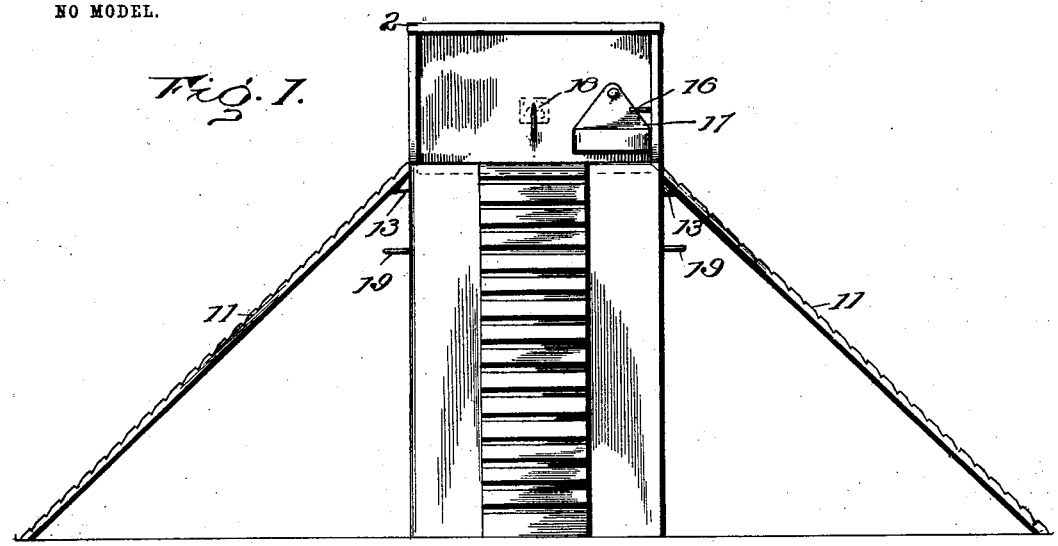
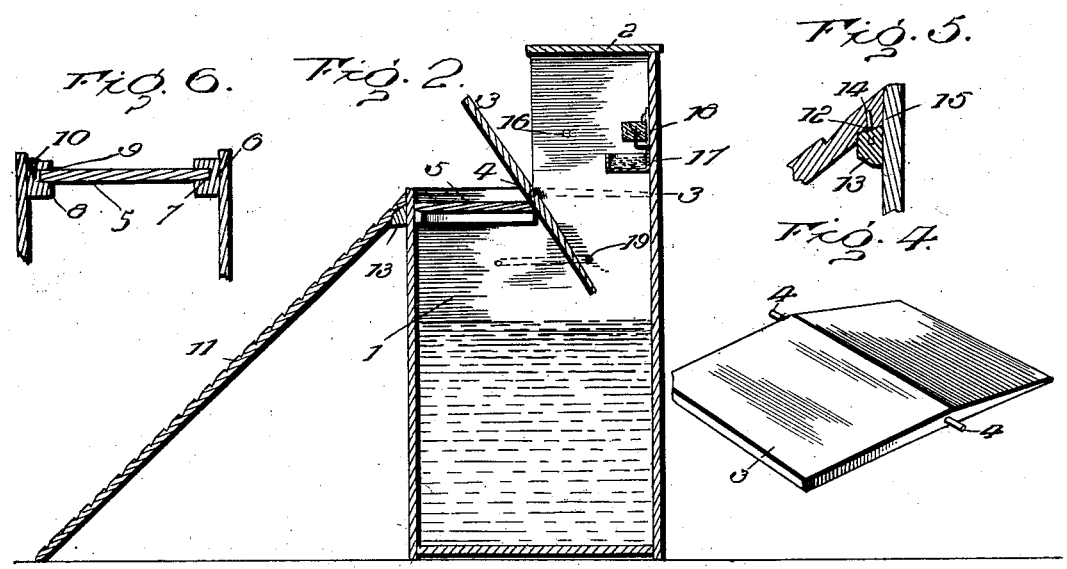
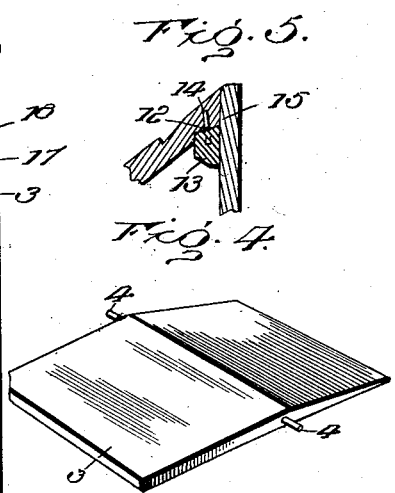
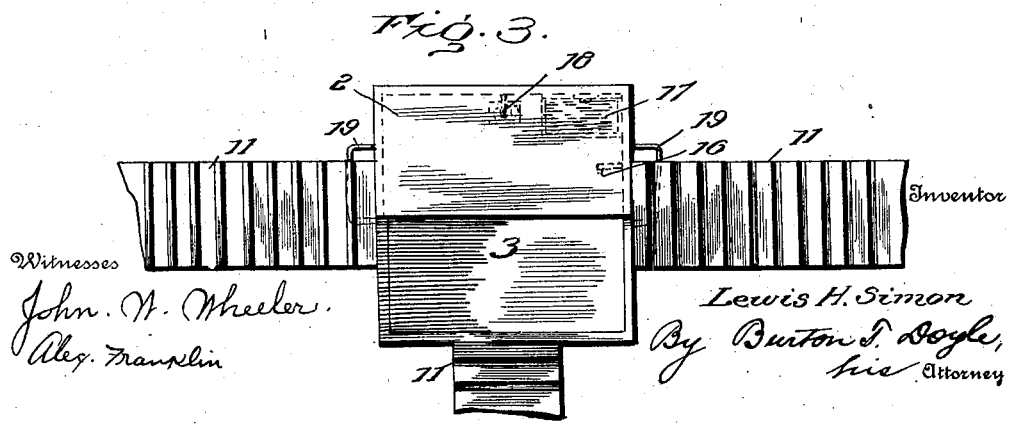
Witnesses
John N. Wheeler
Alex. Franklin
Inventor
Lewis H. Simon
By Burton T. Doyle,
his Attorney
THE NORRIS PETERS CO., PHOTO-LITHO., WASHINGTON, D. C.

No. 758,481. Patented April 26, 1904.

UNITED STATES PATENT OFFICE.

LEWIS H. SIMON, OF ELKINS, WEST VIRGINIA.

SELF-SETTING AND EVER-SET ANIMAL-TRAP.

SPECIFICATION forming part of Letters Patent No. 758,481, dated April 26, 1904.

Application filed April 18, 1903. Serial No. 153,252. (No model.)

*To all whom it may concern:*

Be it known that I, LEWIS H. SIMON, a citizen of the United States, residing at Elkins, in the county of Randolph and State of West Virginia, have invented certain new and useful Improvements in Self-Setting and Ever-Set Animal-Traps, of which the following is a specification.

My invention relates to improvements in self-setting and ever-set animal-traps provided with a drowning-pool or water-basin in which the victims may be strangulated or drowned.

The object of my invention is to produce a handy and inexpensive self-setting and ever-set trap for catching rodents and other animals which it is not desired to catch alive.

Another object of my invention is to produce a trap of the character described which shall be provided with convenient means for enabling the desired animal to reach the dumping-door over the drowning-pool.

Another object of my invention is to produce a trap of the character described which shall have a dumping-door self-poised on side pintles without the use of weights or springs of any kind.

Another object of my invention is to produce a trap of the character described which shall be provided with means for protecting the alluring-bait against molestation by other or larger animals.

Another object of my invention is to produce a trap of the character described which shall be provided with means for preventing the escape of such victims as may not be drowned or strangulated.

I attain these objects and ends by use of the construction, arrangement, and combination of parts represented, and illustrated by the accompanying drawings, which are a part of this specification, and in which—

Figure 1 is a front view. Fig. 2 is a side view. Fig. 3 is a top view. Fig. 4 is a detail view of the dumping-door detached. Fig. 5 is a detail view of the connection used in mounting the causeway, ladder, or run by which the animal reaches the dumping-door; and Fig. 6 is a detail view of the false door and the strips used to hold the same in place and prevent the escape of any victim that is not drowned.

Like characters of reference denote like parts wherever they occur in the various views of the drawings.

1 is the body of the trap, which is made hollow of any desired size or material. At least two-thirds of this hollow body must be made water-tight. The rear part of it is made higher than the front part by cutting vertically downward through the sides about midway thereof and then laterally out through the front wall, as shown in Fig. 2.

2 is a cover extending over the top of the prolonged or rear part of said hollow body, and, together with the sides and back, said cover forms a sort of hood over the dumping-door.

3 is a dumping-door rotatably mounted upon the pintles 4 4 horizontally within the walls of said hollow body and extending within the four walls or the sides of the trap backward and forward to the rear and front inner surfaces thereof forms at the base of the hood the upper surface of the lower part of the top of the trap. While these pintles 4 4 are placed about midway of the side edges of said door, the front half thereof is made thicker and heavier than the rear half thereof by making said door tapering from its pintles to its rear end, so that the law of gravitation will cause the front end of the dumping-door to fall after being tilted and rest upon the false door 5, removably mounted beneath the forward half of the dumping-door upon strips secured horizontally across the inner surface of the front wall and the forward half of each side wall far enough below the top edges of said walls to accommodate between said edges and said strips the thicknesses of both doors. One of the side strips, 6, upon which said false door rests, is provided with a longitudinal groove 7 to receive and hold one end of the false door when the other end thereof rests upon the other side strip, 8, which is provided with a shoulder 9 and turn-buttons 10 10 to engage the upper surface of the false door and prevent its being forced upward when said buttons are clamped. The object of this false door is threefold: It serves to prevent the victim from escaping by forcing the forward end of the dumping-door upward, it permits the basin to be supplied with and emptied of water, and it permits the removal of the dead body of the victim. It is adjusted by having one end thereof inserted in groove 7 of inner strip 6, the other end thereof being let down into shoulder 9 of inner strip 8. Said false door is then secured in place by turning buttons 10 10 so as to make them engage the upper surface of said false door.

11 11 11 are mount-slabs provided with a rough upper surface. These slabs are placed slantingly upward, with the lower ends resting upon the ground or floor upon which the trap stands and the upper ends against the outer surface of the trap at about the rest-level of the dumping-door, to which surface said upper ends are attached by the pinned niche-and-shoulder connection 12, (shown in Fig. 5,) in which 13 13 13 are strips secured horizontally across the front wall and the forward halves of the side walls of the trap just below the plane of the dumping-door and provided with a pin 14, which engages an aperture 15 through the upper end of each slab when its niche, provided in the under surface of its upper end, engages the shoulder provided on said strips. These slabs when attached enable the animal to reach the fatal dumping-door of the trap, and said door tilts upon its pintles and lets the victim tumble down into the water beneath.

16 is a catch-pin set into the side wall of the hood above the dumping-door, and its use is to prevent said door from being tilted too far over when a victim is caught. 17 is a bait-basin or bait-pan for milk or other liquid bait, and 18 is a hook for solid bait, and both of them are attached to the rear wall of the hood and just above the dumping-door.

19 19 are handles provided on either side of the trap to facilitate its being lifted and moved about.

The trap is used by placing it upon the ground, floor, or other surface, baiting it, adjusting the mount-slabs on both sides and in front, and supplying sufficient water in the pool or basin provided in the lower part of its hollow body. The animal scenting the bait climbs one of the slabs and travels across the top of the dumping-door to reach the bait, and when he gets far enough beyond the pintle-line his weight tilts the dumping-door downward, and he lands in the water beneath, which prevents any effective effort to escape; but even if the water has leaked out the clamped false door prevents his tilting the dumping-door upward at the outer end by any effort he may make from beneath it.

Having thus fully described and explained my invention and without meaning to be limited to the exact construction and arrangement of parts shown and described herein, what I claim, and desire to secure by Letters Patent, is—

1. In self-setting and ever-set animal-traps, provided with a dumping-door and a drowning-pool, a detachable false door under the forward half of the dumping-door, said false door resting upon and being detachably held in place by three strips made fast in horizontal positions across and near the top edges of the front and side inner surfaces of the trap-walls; the front strip being plain; one of the side strips being provided with a longitudinal groove, adapted to engage one end of said false door, and the other side strip being provided with a longitudinal shoulder in its inner upper corner, adapted to accommodate the other end of said false door, substantially as described.

2. In self-setting and ever-set animal-traps, provided with a dumping-door, a drowning-pool, a detachable false door beneath the forward half of the dumping-door and strips for said false door to rest upon, turn-buttons to hold said false door detachably in place, substantially as described.

3. In self-setting and ever-set animal-traps, provided with a dumping-door, a drowning-pool, and a detachable false door beneath the forward half of the dumping-door, strips for said false door to rest upon, one of said strips extending horizontally half-way across the inner side-wall surface of the trap near its top edge, and provided with a longitudinal groove, adapted to engage one end of said false door, substantially as described.

4. In self-setting and ever-set animal-traps, provided with a dumping-door, a drowning-pool, and a detachable false door beneath the forward half of the dumping-door, strips for said false door to rest upon, one of said strips extending horizontally half-way across the inner side-wall surface of the trap-body near its upper edge, and provided with a longitudinal shoulder along its upper inner corner, to accommodate one end of the false door, and means for clamping said end therein, substantially as described.

5. In self-setting and ever-set animal-traps, the combination of a hollow body, a drowning-pool within the lower part of said hollow body, a hooded top on said hollow body, a dumping-door tapering backwardly through its rear half and mounted horizontally within the top of said hollow body upon side pintles, a detachable false door under the forward half of said dumping-door resting upon and held in place by three inner strips, the front strip being plain, one side strip being provided with a longitudinal central groove to engage one end of the false door and the other side strip being provided with a longitudinal groove shoulder along its upper inner corner and turn-buttons on the upper side of said shoulder to engage and hold the other end of said false door, a catch sunk into the inner side wall of said hooded top to prevent said dumping-door from being tilted too far over, a bait-hook and a bait-pan mounted within said hooded top upon the rear wall thereof above said dumping-door, rough-surfaced slabs extending slantingly upward from the trap-base to the dumping-door in front and on each side and having pinned niche-and-shoulder connection with outer strips around the front and side edges outside of said dumping-door and handles on the sides of the trap-body, substantially as described.

In testimony whereof I affix my signature in presence of two witnesses.

LEWIS H. SIMON.

Witnesses:
J. H. FOUT,
L. C. WOLFE.